United States Patent
Kim et al.

(10) Patent No.: US 12,401,688 B2
(45) Date of Patent: Aug. 26, 2025

(54) METHOD FOR DETERMINING FALSE FLAGS OF CYBER ATTACKS AND APPARATUS FOR EXECUTING THE METHOD

(71) Applicant: CHUNGBUK NATIONAL UNIVERSITY INDUSTRY-ACADEMIC COOPERATION FOUNDATION, Chungcheongbuk-do (KR)

(72) Inventors: Tae Sung Kim, Chungcheongbuk-do (KR); Soonil Hwang, Chungcheongbuk-do (KR)

(73) Assignee: CHUNGBUK NATIONAL UNIVERSITY INDUSTRY-ACADEMIC COOPERATION FOUNDATION, Chungcheongbuk-Do (KR)

( * ) Notice: Subject to any disclaimer, the term of this patent is extended or adjusted under 35 U.S.C. 154(b) by 0 days.

(21) Appl. No.: 18/841,556

(22) PCT Filed: Mar. 12, 2024

(86) PCT No.: PCT/KR2024/003144
§ 371 (c)(1),
(2) Date: Aug. 26, 2024

(87) PCT Pub. No.: WO2025/121550
PCT Pub. Date: Jun. 12, 2025

(65) Prior Publication Data
US 2025/0193237 A1    Jun. 12, 2025

(30) Foreign Application Priority Data
Dec. 8, 2023   (KR) .................. 10-2023-0177433

(51) Int. Cl.
*H04L 9/40* (2022.01)

(52) U.S. Cl.
CPC ...... *H04L 63/1483* (2013.01); *H04L 63/1425* (2013.01)

(58) Field of Classification Search
CPC ............. H04L 63/1483; H04L 63/1425; H04L 63/1416; H04L 63/1441; H04L 63/1433; H04L 63/1408; H04L 63/20
See application file for complete search history.

(56) References Cited

U.S. PATENT DOCUMENTS 10,972,508 B1*   4/2021   Dods ................... H04L 63/1433
11,863,578 B1*   1/2024   Speck ....................... G06N 5/01
(Continued)

FOREIGN PATENT DOCUMENTS

KR      10-1781450 B1      9/2017
KR    10-2018-0013270 A    2/2018
(Continued)

OTHER PUBLICATIONS

Mode et al., "Impact of False Data Injection Attacks on Deep Learning Enabled Predictive Analytics," NOMS 2020—2020 IEEE/IFIP Network Operations and Management Symposium Year: 2020 | Conference Paper | Publisher: IEEE.*
(Continued)

*Primary Examiner* — Roderick Tolentino
(74) *Attorney, Agent, or Firm* — The PL Law Group, PLLC

(57) ABSTRACT

In a method for determining a false flag of a cyber attack, cyber infringement information is collected from an external server. Artifacts are selected from the collected cyber infringement information according to a preset criterion. Evaluation indicators are classified according to properties of the selected artifacts. A false flag index is calculated based on the classified evaluation indicators.

14 Claims, 4 Drawing Sheets

(56) References Cited

U.S. PATENT DOCUMENTS

| | | | |
|---|---|---|---|
| 12,069,074 B2* | 8/2024 | Amidon | H04L 63/1425 |
| 2018/0191765 A1* | 7/2018 | Cho | H04L 63/1433 |
| 2019/0215312 A1* | 7/2019 | Zigdon | H04L 65/1104 |
| 2020/0076831 A1* | 3/2020 | Baughman | H04L 63/20 |
| 2020/0351244 A1* | 11/2020 | Moore | H04L 63/20 |
| 2021/0218527 A1* | 7/2021 | Li | H04L 27/0008 |
| 2023/0087267 A1* | 3/2023 | Shi | G06F 16/2237 |
| | | | 726/23 |
| 2024/0214396 A1* | 6/2024 | Kim | H04L 41/16 |

FOREIGN PATENT DOCUMENTS

| | | |
|---|---|---|
| KR | 10-1832292 B1 | 4/2018 |
| WO | WO 2023/012849 A1 | 2/2023 |

OTHER PUBLICATIONS

Li et al., "Detection of False Data Injection Attacks on Industrial Control Systems Based on Joint Analysis of Principal Components and Independent Components," 2023 3rd International Conference on Computer Science, Electronic Information Engineering and Intelligent Control Technology (CEI) Year: 2023 | Conferenc.*

Florian Skopik et al., "Under false flag: using technical artifacts for cyber attack attribution", Cybersecurity, 2020, vol. 3, No. 8, pp. 1-20, DOI;10.1186/s42400-020-00048-4.

* cited by examiner

METHOD FOR DETERMINING FALSE FLAGS OF CYBER ATTACKS AND APPARATUS FOR EXECUTING THE METHOD

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2024/003144 filed Mar. 12, 2024, which claims priority to the benefit of Korean Patent Application No. 10-2023-0177433 filed on Dec. 8, 2023, in the Korean Intellectual Property Office, the entire contents of which are incorporated herein by reference.

BACKGROUND

1. Technical Field

Embodiments of the present invention relate to a method for determining false flags of cyber attacks.

2. Background Art

In the cyber world, there is a tense conflict between attacks by hackers, who are attackers, and tracking by security analysts, who are defenders. A cyber war where attackers try to hide their attacks and analysts try to track down the attackers' true identity is taking place. In this case, security analysts have no choice but to analyze attacker's hacking activities based on artifacts collected from an infringement incident and rely on the artifacts collected from the infringement incident.

However, as cyber attack technology develops, an attacker's false flag also develops, and thus analysts can easily be deceived by the attacker's false flag. Accordingly, it is becoming more difficult to respond to the attacker's false flag using existing infringement incident analysis or attacker tracking method, and incorrect response to infringement is causing financial losses and budget waste.

That is, since the existing infringement incident analysis or attacker tracking method only considers the analyst's experience and security viewpoint, there is a problem in that it is difficult to actually respond to a cyber false flag because the viewpoint of the attacker who actually executes the cyber false flag is excluded.

SUMMARY

Embodiments of the present invention are intended to determine false flags for cyber attacks based on artifacts that reflect not only the viewpoints of security analysts, who are defenders of cyber attacks, but also the viewpoints of hackers, who are attackers.

According to an exemplary embodiment of the present invention, there is provided a method for determining false flags of cyber attacks, which is performed by a computing device that includes one or more processors and a memory storing one or more programs executed by the one or more processors, the method including collecting, by the computing device, cyber infringement information from an external server, selecting, by the computing device, artifacts from the collected cyber infringement information according to a preset criterion, classifying, by the computing device, evaluation indicators according to properties of the selected artifacts, and calculating, by the computing device, a false flag index based on the classified evaluation indicators.

The method for determining false flags of cyber attacks may further include determining, by the computing device, a false flag for the collected cyber infringement information based on the calculated false flag index, and providing the determination result to a user.

The collecting of the cyber infringement information may further include classifying the collected cyber infringement information by attacker and storing cyber infringement information for each attacker, by the computing device.

The artifacts may be one or more of internet protocol (IP), Domain, Port, uniform resource locator (URL), C2 server (Command & Control server), Server hosting records, HTTP referrer, Log, Email address, Cryptocurrency address, Hardware Information, Encryption/decryption method, Obfuscation, Meta Digital Data, certificate, Packing, Development information, Time stamp, Region, Language, Hash value, File type, Behavior pattern, Library, Zero-day, N-day, Remote Code Execution (RCE), Privilege Escalation, Shellcode, Decoy document, Phishing & Pharming, SNS account, and Attack target.

The evaluation indicators may be one or more of Network, Server, and Host based on an infrastructure-related fundamental factor, and Anti-debugging, Development Environment, Malware, Vulnerability, and Social Engineering based on an attack technique-related attack factor.

The calculating of the false flag index may further include calculating, by the computing device, an attack index for each selected artifact, calculating, by the computing device, an attack index for each evaluation indicator based on the calculated attack index for each artifact, calculating, by the computing device, a total attack index by adding up all the calculated attack indexes for each evaluation indicator, calculating, by the computing device, an actual attack index based on the calculated total attack index above and a weight according to a correlation between evaluation indicators, and calculating, by the computing device, the false flag index based on the calculated actual attack index.

The calculating of the attack index for each selected artifact may further include setting, by the computing device, a weight for each artifact by assigning a preset weight to each of the selected artifacts, comparing, by the computing device, a pre-stored artifact and the selected artifact to calculate a degree of similarity for each artifact, and calculating, by the computing device, an attack index for each artifact based on the set weight for each artifact and the calculated degree of similarity for each artifact.

The calculating of the degree of similarity for each artifact may further include extracting, by the computing device, an artifact for a specific attacker from pre-stored artifacts for each attacker, and comparing, by the computing device, the extracted artifact for a specific attacker and the selected artifact to calculate the degree of similarity for each artifact for the specific attacker.

The calculating of the attack index for each evaluation indicator may further include calculating, by the computing device, an attack index for each evaluation indicator by adding up the artifact attack index included in each evaluation indicator according to the classified evaluation indicators.

According to another exemplary embodiment of the present invention, there is provided an apparatus for determining false flags of cyber attacks, including an information collection unit that collects cyber infringement information from an external server, an artifact selection unit that selects artifacts from the collected cyber infringement information according to a preset criterion, an evaluation indicator classification unit that classifies evaluation indicators according to properties of the selected artifacts, and a false flag index calculation unit that calculates a false flag index based on the classified evaluation indicators.

According to embodiments of the present invention, by determining the false flags of cyber attacks based on infringement artifacts that reflect the viewpoint of the attacker, who is the hacker, as well as the viewpoint of the security analyst, who is the defender of the cyber attacks, the false flags of the cyber attacks can be determined more systematically and objectively, and a more effective response to the infringement can be performed.

In addition, according to embodiments of the present invention, by using cyber infringement information for each hacker and collected cyber infringement information to determine the false flags of hackers who performed cyber attacks based on cyber infringement artifacts, the false flags of the cyber attacks can be determined more systematically and objectively and a more effective response to the infringement can be performed.

DETAILED DESCRIPTION

Hereinafter, a specific embodiment of the present disclosure will be described with reference to the drawings. The following detailed description is provided to aid in a comprehensive understanding of the methods, apparatus and/or systems described herein. However, this is illustrative only, and the present disclosure is not limited thereto.

In describing the embodiments of the present disclosure, when it is determined that a detailed description of related known technologies may unnecessarily obscure the subject matter of the present disclosure, a detailed description thereof will be omitted. Additionally, terms to be described later are terms defined in consideration of functions in the present disclosure, which may vary according to the intention or custom of users or operators. Therefore, the definition should be made based on the contents throughout this specification. The terms used in the detailed description are only for describing embodiments of the present disclosure, and should not be limiting. Unless explicitly used otherwise, expressions in the singular form include the meaning of the plural form. In this description, expressions such as "comprising" or "including" are intended to refer to certain features, numbers, steps, actions, elements, some or combination thereof, and it is not to be construed to exclude the presence or possibility of one or more other features, numbers, steps, actions, elements, some or combinations thereof, other than those described.

In the description below, "transfer", "communication", "transmission", "reception" of signals or information and other terms with similar meanings of signals or information include not only direct transmission of signals or information from one component to another component, but also transmission through other components. In particular, "transferring" or "transmitting" a signal or information as a component indicates a final destination of the signal or information and does not mean a direct destination thereof. This is the same for "receiving" a signal or information. In addition, in this specification, the expression that two or more data or information is "related" means that if one data (or information) is acquired, at least part of the other data (or information) can be acquired based on it.

Figure 1:
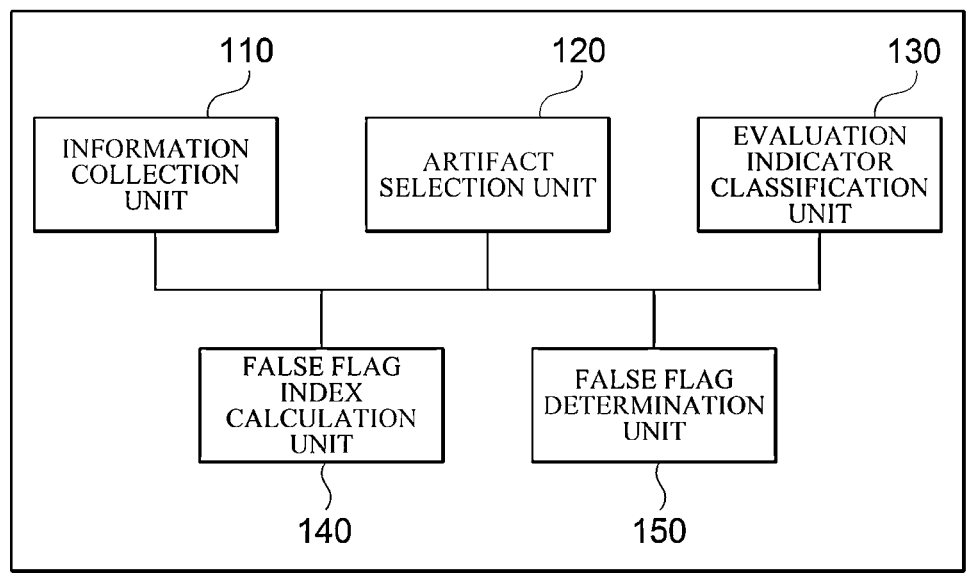
FIG. 1 is a configuration diagram illustrating an apparatus for determining false flags of cyber attacks according to an embodiment of the present invention.

FIG. 1 is a configuration diagram for describing an apparatus 100 for determining false flags of cyber attacks according to an embodiment of the present invention.

Referring to FIG. 1, the apparatus 100 for determining false flags of cyber attacks according to an embodiment of the present invention may include an information collection unit, an artifact selection unit 120, an evaluation indicator classification unit 130, a false flag index calculation unit 140 and a false flag determination unit 150.

Meanwhile, the apparatus 100 for determining false flags of cyber attacks is an apparatus that collects various infringement incident information related to a cyber attack and analyzes the collected infringement incident information to determine a false flag of a hacker who performed the cyber attack. Here, the cyber attack refers to any actions that can cause social or economic damage by attacking a network or computer system using information and communication technologies such as hacking, computer viruses, etc. In addition, the infringement incident information related to the cyber attack includes all types of infringement incident information directly or indirectly related to the cyber attack. In this case, a digital trace or evidence left by the hacker during a cyber attack among the infringement incident information are referred to as an artifact. Such an artifact may be used to identify an action, attack method, intrusion path, and trace of malicious activity of a hacker through cyber infringement incident investigation and post-mortem analysis. In addition, a false flag refers to a method in which a hacker deceives or misleads the user into thinking that the characteristics of his or her source, identity, or attack technique belong to another hacker.

That is, the apparatus 100 for determining false flags of cyber attacks according to an embodiment of the present invention uses pre-stored cyber infringement information for each hacker and collected cyber infringement information to determine the possibility that a cyber infringement artifact is a false flag of a hacker who performed a cyber attack.

The information collection unit 110 may collect cyber infringement information. Specifically, the information collection unit 110 may collect the cyber infringement information about the cyber attack from a plurality of information sharing channels. For example, the plurality of information sharing channels may be Cyber Black Box, C-share (infringement incident information sharing system operated by the Korea Internet & Security Agency), Domain Name Server based Black List (DNSBL) distribution sites/malware sharing channels (e.g., virusshare.com, etc.). Here, the cyber infringement information may include indicators of compromise (IOC), indicators of attack (IOA), and indicators of behavior (IOB). The IOC may refer to indicators by which a hacker can be recognized when an incident occurs, the IOA may refer to preemptive measures before an attack is successful (code execution, command control, persistent concealment, proliferation, etc.), and the IOB may refer to a specific pattern of behavior observed in a system or network. In this case, the information collection unit 110 may collect cyber infringement information by major attacker (hacker) and classify cyber infringement information for each attacker.

The artifact selection unit 120 may select artifacts from among cyber infringement information. Specifically, the artifact selection unit 120 may select artifacts from among cyber infringement information according to a preset criterion. For example, the artifact selection unit 120 may select 33 types of artifacts among from among cyber infringement information by dividing them into an infrastructure-related fundamental factor and an attack technique-related attack factor.

The artifacts may include internet protocol (IP), Domain, Port, uniform resource locator (URL), C2 server (Command & Control server), Server hosting records, HTTP referrer, Log, Email address, Cryptocurrency address, Hardware Information, Encryption/decryption method, Obfuscation, Meta Data, Digital certificate, Packing, Development information, Time stamp, Region, Language, Hash value, File type, Behavior pattern, Library, Zero-day, N-day, Remote Code Execution (RCE), Privilege Escalation, Shellcode, Decoy document, Phishing & Pharming, SNS account, and Attack target. These artifacts may be constructed by selecting artifacts useful for analyzing a false flag from among cyber infringement information by taking into account the viewpoint of a hacker who is an attacker and the viewpoint of a security analyst who is a defender, based on an analytic hierarchy process (AHP). Meanwhile, although the present invention has been described as selecting 33 pre-selected artifacts from among cyber infringement information, but is not limited thereto, and more or fewer artifacts than 33 artifacts may be selected depending on the viewpoint of the hacker and security analyst.

The evaluation indicator classification unit 130 can classify evaluation indicators artifacts into according to the properties the artifacts. Specifically, the evaluation indicator classification unit 130 may classify the evaluation indicators into evaluation indicators according to the properties of the 33 artifacts selected by the artifact selection unit 120. For example, the evaluation indicators classified according to the properties of the artifacts may include Network, Server, Host based on the infrastructure-related fundamental factor, and Anti-debugging, Development Environment, Malware, Vulnerability, and Social Engineering based on the attack technique-related attack factor.

The contents of the main evaluation indicators are summarized as follows.

Network is a basic element of cyber security incident analysis and may include IP, Domain, and Port.

IP may refer to a unique identifier assigned to a device connected to the Internet. Hackers attempt to disguise IP by utilizing VPNs, proxies, or using hacking techniques such as spoofing, and IP may be useful for a false flag because IP may be difficult to track due to its impermanence and high volatility. In a cybersecurity incident, IP can become evidence when the same computer or digital device is repeatedly detected using the same infrastructure.

Domain may refer to a system for naming devices, services, or related entities connected to the Internet. Hackers often control domains through their hosting provider's account. These domains may become evidence in cybersecurity investigations.

Port may refer to a communication channel. Port may be changed as needed, and hackers may use Port to disguise malicious traffic as legitimate TLS traffic.

Server is an important element in propagating attacks, and may include uniform resource locator (URL), C2 server (Command & Control server), Server hosting records, HTTP referrer, and Log.

URL may refer to an address for exchanging data between multiple computers on the Internet, and may indicate a location of a web page. URL may be exploited for a false flag through a variety of techniques, for example, URL spoofing may be used. In other words, URL spoofing may be used to trick or disguise an address displayed on the Internet to make it look like another specific site.

C2 server may be a key component of a false flag as it is utilized to control victim systems and issue commands through malware. For example, even if C2 server of hackers, which is used for malicious code and system hacking, is blocked and inaccessible, hackers may manage the server by logging in with an account maintained by a hosting provider. As a result, hackers may use hacking techniques in order to legitimately exploit or disguise C2 server managed by the hosting provider.

Server hosting records may refer to hosting records provided by a hosting provider. Hackers often rent C2 server from the hosting provider in order to communicate with malicious code, and may check Server hosting records from a hosting provider through certain procedures, or track records by examining information provided by web engines.

HTTP referrer may refer to information about a source of the current web page. This information about the source of the current web page is transmitted to the server so that an administrator may identify a user's traffic source. In this case, referrer data may be spoofed through firewalls and proxy systems, or disguised by manipulating an HTTP uniform resource identifier (URI) header field.

Log may refer to a file that records an operating activity of an operating system or software. Log may be commonly used to analyze attack methods when investigating cybersecurity incidents. In this case, if hackers operate secretly using tools built into the operating system, they can delete log files or make attack detection difficult.

Host is an element for tracking information related to hackers and victim hosts, and may include Email address, Cryptocurrency address, and Hardware Information.

Email address may be disguised to lure victims or hide a hacker's identity. Email address has a vulnerability in an SMTP protocol responsible for sending emails, which may cause an email header to appear to come from another source through spoofing. This allows hackers to hide their identity and use it for a false flag.

Cryptocurrency address may refer to computer code that facilitates transactions without revealing account holder information. Cryptocurrencies address may operate through blockchain technology and allow money to be laundered outside of the traditional banking system.

Hardware information may include data about system's hardware components, such as hard drives, network interface cards, MAC addresses, SIM cards, IMEI numbers, etc. Hardware information may be used to identify the system.

Anti-debugging is an element that complicates intrusion analysis and may include Encryption/decryption method, Obfuscation, Meta Data, Digital certificate, and Packing.

Encryption/decryption method allows hackers to use encryption technology to enhance communication security or hide communication data and attack code from malicious code. In particular, ransomware often uses unique encryption methods to encrypt target files, which can show hacker's characteristics.

Obfuscation may refer to a technique used by hackers to make malicious or attack code difficult to analyze. Since hackers use different obfuscation methods, it can reveal characteristics of hackers.

Metadata may refer to information used for quick search according to specific rules, such author information, privilege conditions, usage conditions, and usage details.

Digital certificate may refer to a certificate issued by a certification authority. If an executable file is signed with Digital certificate, it can be recognized as secure. Such a Digital certificate may slip through anti-virus systems due to human error or hacking.

Packing may refer to a technique for compressing or encrypting executable files that hackers can use to hide their code. Hackers can use packaging techniques to evade detection, and reveal their characteristics.

Development Environment is an element that can be included when developing attack technology, and may include Development information, Time stamp, Region, and Language.

Development information may include a character string and debug path. The debug path may contain any name an author prefers.

Time stamp may be included in compiled code of malicious code. Time stamp may indicate working hours and time zone in which malicious code was developed.

Region may indicate information about a location of a hacker. Hackers often use anonymized services to hide their activities, but information about locations of attackers may be leaked by mistake.

Language may refer to a font included in malicious code. If Language is in a language of a specific country, it may indicate the characteristics of hackers.

Malware is an element related to the characteristics of malicious code, and may include Hash value, File type, and Behavior pattern.

Hash value is used to identify malicious code, and data contained in the file can be calculated using a one-way algorithm.

File type may be used to identify traces of malware through its association with a specific file type.

Behavior pattern may refer to a unique pattern displayed by malicious code. Malicious code transmitted by the same hacker may show similarities. In addition, it may show similarities to code developers or source code within the same malicious code family. These features can be used for malicious code analysis.

Library may be used dependently during a software development stage. The characteristics of hackers can be revealed through frequently used Library. The characteristics of hackers can be revealed through frequently used Library.

Vulnerability is an element related to an actual attack method, and may include Zero-day, N-day, Remote Code Execution (RCE), Privilege Escalation, and Shellcode.

Zero-day may indicate vulnerability of Zero-day used in targeted attacks.

N-day may indicate vulnerability of N-day that has been patched but is still being exploited.

Remote Code Execution (RCE) may indicate a type of cyberattack in which hackers remotely install malicious code on a system or network.

Privilege Escalation may indicate a type of cyberattack in which hackers attempt to gain escalated privileges when they initially lack access to the system.

Shellcode may refer to attack code used by hackers to take complete control of the system by exploiting vulnerabilities. Shellcode is usually written in hexadecimal opcode format, but hackers often create advanced shellcode in order to make detection difficult. This may indicate the characteristics of hackers.

Social Engineering is an element related to an attack target, and may include Decoy document, Phishing Pharming, SNS account, and Attack target.

Decoy document may be a document used by hackers to lure victims into installing malicious code. Such a document may be used to grasp whether a hacker's attack occurred, the extent of information leakage, and a hacker's intention.

Phishing may refer to a method of illegally obtaining personal information such as passwords and credit card information using methods such as emails, URLS, websites, online games, and social media. In addition, Pharming may refer to a method of directing users to fake websites. These methods may indicate the characteristics of hackers.

SNS account may be linked to an email account to help identify hackers. For example, if an email account identified in the previous hacking was used to create a social media account and continued to be used thereafter, SNS account could be used for analysis.

Attack target can be helpful in identifying hackers if the user has a political or cultural conflict with the hackers or has political connections.

The false flag index calculation unit 140 may calculate a false flag index based on the evaluation indicators.

In an exemplary embodiment, the false flag index calculation unit 140 may set a weight for each artifact by assigning a preset weight to a selected artifact. Specifically, the false flag index calculation unit 140 may assign a preset weight to each of the 33 artifacts according to the priority and importance of the artifacts by taking into account the viewpoint of a hacker who is an attacker and the viewpoint of a security analyst who is a defender, based on an analytic hierarchy process (AHP). In this case, the weight for each artifact may be set by assigning a preset weight to each artifact so that the total sum of preset weights becomes 1. For example, the weights set for artifacts are as shown in the table below.

TABLE 1

| priority | artifact | weight |
| --- | --- | --- |
| 1 | Zero-day | 0.297028888 |
| 2 | Privilege Escalation | 0.049701241 |
| 3 | Shellcode | 0.048673115 |
| 4 | Remote Code Execution | 0.045817191 |
| 5 | Attack target | 0.043882166 |
| 6 | Behavior pattern | 0.043274665 |
| 7 | Development information | 0.042781236 |
| 8 | Digital certificate | 0.039464996 |
| 9 | N-day | 0.036768101 |
| 10 | Library | 0.027196932 |
| 11 | Cryptocurrency address | 0.024661593 |
| 12 | Language | 0.024026261 |
| 13 | Server hosting records | 0.023897947 |
| 14 | Log | 0.020599153 |
| 15 | Decoy document | 0.020521488 |
| 16 | Time stamp | 0.018997814 |
| 17 | IP | 0.018832682 |

TABLE 1-continued

| priority | artifact | weight |
|---|---|---|
| 18 | Hash value | 0.018465057 |
| 19 | C2 server | 0.017768075 |
| 20 | Region | 0.017057027 |
| 21 | Phishing & Pharming | 0.013137802 |
| 22 | SNS account | 0.012854965 |
| 23 | Encryption/decryption method | 0.012808789 |
| 24 | File type | 0.012616192 |
| 25 | Obfuscation | 0.012196382 |
| 26 | Hardware Information | 0.010647166 |
| 27 | Domain | 0.008398051 |
| 28 | URL | 0.007680378 |
| 29 | Meta Data | 0.007280107 |
| 30 | HTTP referrer | 0.007014646 |
| 31 | Packing | 0.006274525 |
| 32 | Email address | 0.005741198 |
| 33 | Port | 0.003934171 |
| Total | | 1 |

In addition, the false flag index calculation unit 140 may calculate a degree of similarity for each artifact by comparing a pre-stored artifact and a selected artifact. Specifically, the index calculation unit 140 may extract an artifact for a specific hacker from pre-stored artifacts for each hacker, and compares the artifact for the specific hacker with a selected artifact to calculate the degree of similarity of each artifact for the specific hacker. In this case, the specific hacker may be a hacker expected to have carried out a cyber attack. That is, by calculating the degree of similarity for each artifact with a specific hacker, it is possible to determine the possibility that it is a false flag by a specific hacker. The false flag index calculation unit 140 may calculate the degree of similarity for each artifact according to a preset criterion. For example, according to the preset criterion, if the similarity is 70% or more, the degree of similarity is determined to be high, and 3 can be calculated as the degree of similarity. In addition, if the similarity is 40% or more, the degree of similarity is determined to be medium, and 2 can be calculated as the degree of similarity. In addition, if the similarity is 10% or more, the degree of similarity is determined to be low, and 1 can be calculated as the degree of similarity. In addition, if the similarity is less than 10% or the relevant artifact has not been collected, it is determined that there is no degree of similarity, and 0 can be calculated as the degree of similarity.

In addition, the false flag index calculation unit 140 may calculate an attack index for each artifact based on a weight for each artifact and the degree of similarity for each artifact. Specifically, the false flag index calculation unit 140 may calculate an attack index of each artifact by multiplying the set weight for each artifact and the calculated degree of similarity for each artifact. For example, in the case of IP, if the set weight is 0.018832682 and the degree of similarity is calculated as 3, the attack index of IP may be 0.056498046.

In addition, the false flag index calculation unit 140 may calculate an attack index for each evaluation indicator based on the attack index for each artifact. Specifically, the false flag index calculation unit 140 may calculate the attack index for each evaluation indicator by adding up the attack indexes of artifacts included in each evaluation indicator according to the previously classified evaluation indicators. For example, if the evaluation indicator is Network, an attack index of Network can be calculated by adding up all attack indexes of artifacts (IP, Domain, and Port) included in Network.

In addition, the false flag index calculation unit 140 may calculate a total attack index by adding up all attack indexes for each evaluation indicator. In this case, the calculated total attack index may be expressed as a percentage.

In addition, the false flag index calculation unit 140 may set a weight according to a correlation between evaluation indicators based on the degree of similarity for each artifact. For example, the false flag index calculation unit 140 extracts an artifact with the degree of similarity for each artifact of 3, and may assign a weight of 1 times thereto if the artifact is extracted, assign a weight of 2 times thereto if the extracted artifact is included in two evaluation indicators, and assign a weight of 3 times thereto if the extracted artifact is included in three or more evaluation indicators. In addition, the false flag index calculation unit 140 extracts an artifact with the degree of similarity for each artifact of 3, and may assign a weight of 3 times thereto if the extracted artifact is included in a preset evaluation indicator. Here, the preset evaluation indicators may be Malware (Hash value, File type, Behavior pattern, Library), Infrastructure (Network (IP, Domain, Port), or Server (URL, C2 server, and Server hosting records). In this case, the weight according to the correlation between evaluation indicators can be set to the highest value among assigned weights. In addition, the weight according to the correlation between evaluation indicators can be set to one of 1 times, 2 times, and 3 times. Since it is difficult for hackers to maintain consistency and synchronization between various artifacts in order to achieve a false flag, the possibility that it is an actual attack by a hacker can be increased by assigning a weight through the correlation between various artifacts.

In addition, the false flag index calculation unit 140 may calculate an actual attack index based on the total attack index and the weight according to the correlation between evaluation indicators. Specifically, the false flag index calculation unit 140 may calculate the actual attack index by multiplying the total attack index and the weight according to the correlation between the evaluation indicators. Here, the actual attack index may refer to a value expressing the degree of possibility that the infringement artifact of the cyber attack is an actual attack.

In addition, the false flag index calculation unit 140 may calculate a false flag index based on the actual attack index. For example, the false flag index calculation unit 140 may calculate the false flag index by subtracting the actual attack index from 100. Here, the false flag index may refer to a value expressing the degree of possibility that the infringement artifact of the cyber attack is the false flag. In the present invention, the cyber attack can be evaluated by calculating the false flag index (false flag index=100−actual attack index) under the assumption that it is an actual attack or a false flag attack.

The false flag determination unit 150 may determine a false flag based on the false flag index. Specifically, the false flag determination unit 150 may determine, based on the false flag index, the possibility that collected cyber infringement information is a false flag. For example, if the false flag index is 0, the false flag determination unit 150 may determine that there is no possibility that it is the false flag. In addition, if the false flag index is 1 to 40, the false flag determination unit 150 may determine that the possibility that it is the false flag is low. In addition, if the false flag index is 41 to 70, the false determine that the flag determination unit 150 may possibility that it is the false flag is medium. In addition, if the false flag index is 71 to 90, the false flag determination unit 150 may determine that the possibility that it is the false flag is high. In addition, if the false flag index is 91 to 100, the false flag determination unit 150 may determine that the possibility that it is the false flag is very high.

In addition, the false flag determination unit 150 may provide the determination result to the user For example, assuming that Behavior pattern and IP similar to those of a specific hacker are collected from cyber infringement information, a weight set for Behavior pattern is 0.043274665, and a weight set for IP is 0.018832682. Since artifacts similar to those of the specific hacker have been collected, when comparing the selected artifact with the previously stored artifact for the specific hacker, each of the similarity of Behavior pattern and the similarity of IP can be calculated as 3. In addition, since each of the similarity of Behavior pattern and the similarity of IP is 3 and is included in the preset evaluation indicators (Malware and Network), the weight according to the correlation between evaluation indicators can be given a weight of 3 times. If the actual attack index is calculated based on this, (0.043274665*3+0.018832682*3)*100*3=55.90, and the false flag index can be 100−55.90=44.10. If the false flag index is 41 to 70, the possibility that it is a false flag by a specific hacker can be determined to be medium.

For example, assuming that artifacts similar to those specific hackers A and B (Behavior pattern, C2 server, N-day, Language, Attack target, Digital certificate) are collected from cyber infringement information, as shown in Table 2 below, the possibility of false flags by specific hackers A and B can be determined, as shown in Table 2 below.

TABLE 2

| artifact | weight | degree of similarity A | degree of similarity B |
|---|---|---|---|
| Behavior Pattern | 0.043274665 | 3 | 3 |
| C2 server | 0.017768075 | 3 | 0 |
| N-day | 0.036768101 | 0 | 0 |
| Language | 0.024026261 | 0 | 3 |
| Attack target | 0.043882166 | 3 | 0 |
| Digital certificate | 0.039464996 | 3 | 0 |
| weight according to correlation | | 3 | 2 |
| actual attack Index | | 100 | 40.3805556 |
| false flag index | | 0 | 59.619444 |

As shown in Table 2 above, when comparing the pre-stored artifacts of a specific hacker A with the selected artifacts, the degree of similarity of each of Behavior pattern, C2 server, Attack target, and Digital certificate can be calculated as 3. In addition, when comparing the pre-stored artifacts of a specific hacker B and the selected artifacts, each of the degree of similarity of Behavior pattern and the degree of similarity Language can be calculated as 3. For the specific hacker A, each of the degree of similarity of Behavior pattern and the degree of similarity C2 server is 3 and Behavior pattern and C2 server are included in the preset evaluation indicators (Malware and C2 server), and thus the weight according to the correlation between evaluation indicators can be given a weight of 3 times. For the specific hacker B, each of the degree of similarity of Behavior pattern and the degree of similarity of Language is 3, and Behavior pattern and Language are included in two evaluation indicators, and thus the weight according to the correlation between evaluation indicators can be given a weight of 2 times. Based on this, if the actual attack index is calculated for the specific hacker A, the actual attack index is (0.043274665*3+0.017768075*3+0.043882166*3+0.039464996*3)*100*3=129.9509118, and thus the actual attack index becomes 100 and the false flag index becomes 0. In addition, if the actual attack index is calculated for the specific hacker B, the actual attack index is (0.043274665*3+0.024026261*3)*100*2=40.3805556, and thus the actual attack index becomes 40.38, and the false flag index becomes 100−40.38=59.62. Therefore, from the collected cyber infringement information, the possibility that it is an actual attack by the specific hacker A can be determined to be very high, and the possibility that it is a disguised attack by the specific hacker B can be determined to be medium.

That is, the apparatus 100 for determining false flags of cyber attacks according to an embodiment of the present invention may use pre-stored cyber infringement information for each hacker and collected cyber infringement information to determine the possibility that artifacts of cyber infringement are a false flag of a hacker who performed a cyber attack.

Figure 2:
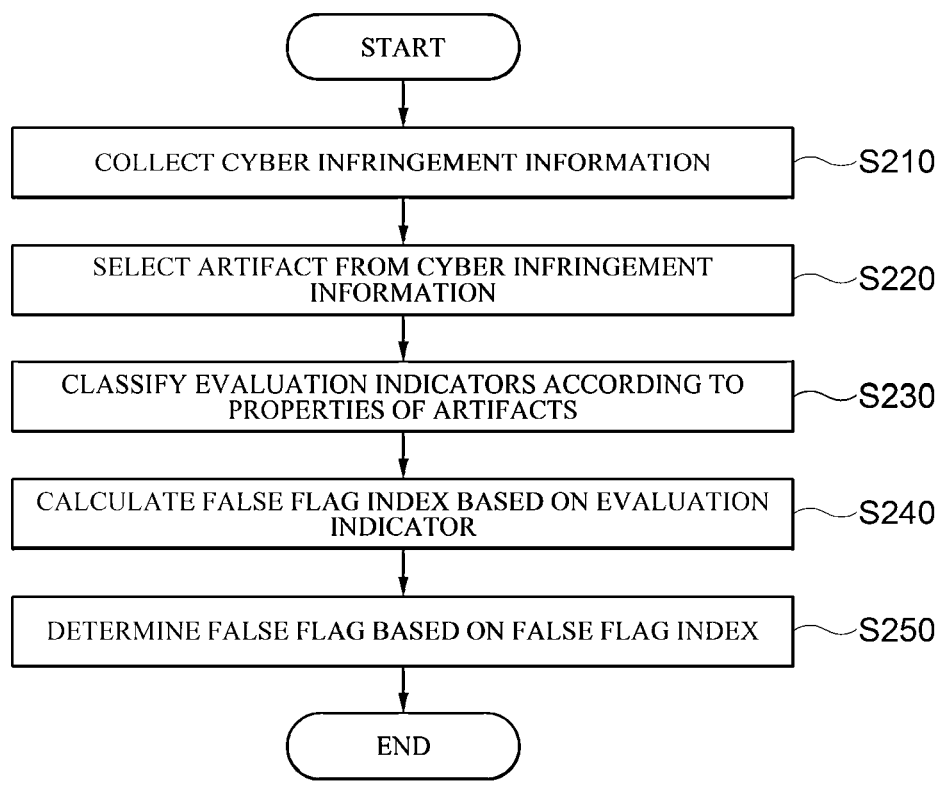
FIG. 2 is a flowchart illustrating a method for determining false flags of cyber attacks according to an embodiment of the present invention.

FIG. 2 is a flowchart for describing a method for determining false flags of cyber attacks according to an embodiment of the present invention. The method shown in FIG. 2 can be performed, for example, by the apparatus for determining false flags of cyber attacks described above. In the illustrated flowchart, the method for determining false flags of cyber attacks is described by being divided into a plurality of steps, but at least some steps are performed in a different order, are performed by being combined with other steps, are omitted, are performed by being divided into detailed steps, or may be performed by being added with one or more steps not shown.

In step 210, the computing device 12 may collect cyber infringement information. Specifically, the computing device 12 may collect cyber infringement information about the cyber attack from a plurality of information sharing channels.

In step 220, the computing device 12 may select artifacts from among the cyber infringement information. Specifically, the computing device 12 may select artifacts from among the cyber infringement information according to a preset criterion. For example, the artifact selection unit may select 33 types of artifacts from among cyber infringement information by dividing them into the infrastructure-related fundamental factor and attack technique-related attack factor.

In step 230, the computing device 12 may classify evaluation indicators according to properties the artifacts. Specifically, the computing device 12 may classify evaluation indicators according to the properties of the 33 artifacts selected by the artifact selection unit 120. For example, the evaluation indicators classified according to the properties of the artifacts may include Network, Server, Host based on the infrastructure-related fundamental factor and Anti-debugging, Development Environment, Malware, Vulnerability, Social Engineering based on the attack technique-related attack factor.

In step 240, the computing device 12 may calculate a false flag index based on the evaluation indicators. Step 240 will be described in more detail with reference to FIG. 3 below.

In step 250, the computing device 12 may determine a false flag based on the false flag index. Specifically, the computing device 12 may determine, based on the false flag index, the possibility that the collected cyber infringement information is the false flag.

Figure 3:
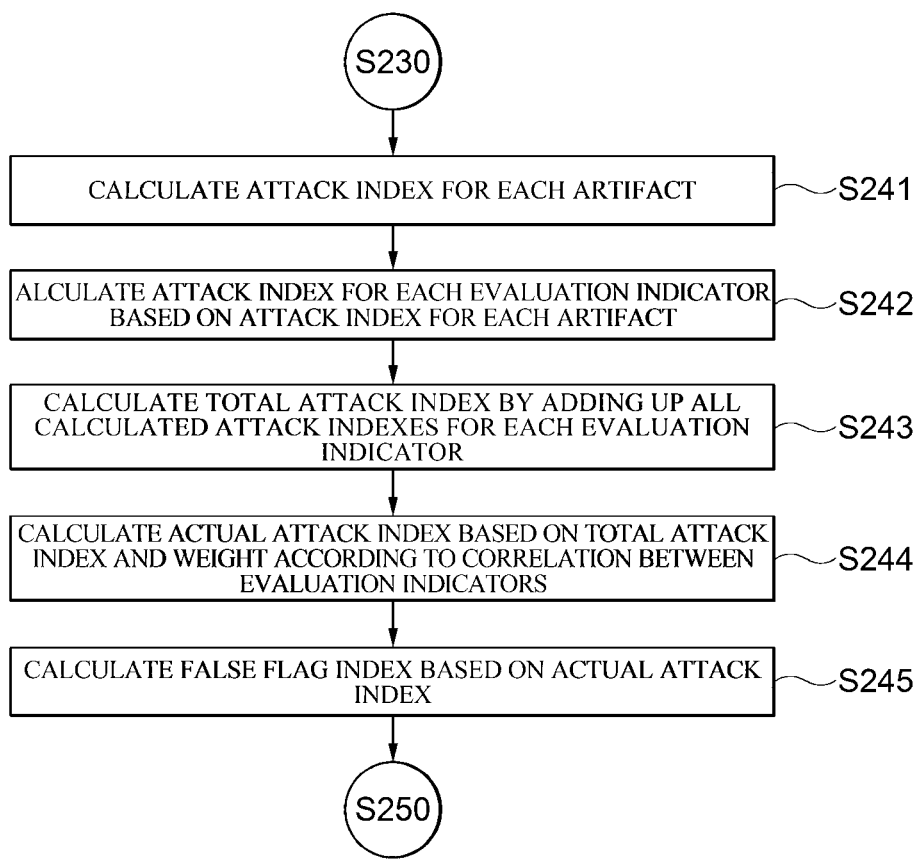
FIG. 3 is a flowchart for describing step 240 of the method for determining false flags of cyber attacks according to an embodiment of the present invention.

FIG. 3 is a flowchart for describing the step 240 of the method for determining false flags of cyber attacks according to an embodiment of the present invention.

In step 241, the computing device 12 may calculate an attack index for each artifact. In this case, the computing device 12 may calculate a weight for each artifact by assigning preset weights to selected artifacts. In addition, the computing device 12 may calculate the degree of similarity artifact by comparing pre-stored artifacts and the selected artifacts. In addition, the computing device 12 may calculate an attack index for each artifact based on the weight for each artifact and the degree of similarity for each artifact. That is, the computing device 12 may calculate an attack index for each evaluation indicator by adding up the attack indexes of artifacts included in each evaluation indicator according to the pre-classified evaluation indicators.

In step 242, the computing device 12 may calculate an attack index for each evaluation indicator based on the attack index for each artifact. In this case, the calculated total attack index may be expressed as a percentage.

In step 243, the computing device 12 may calculate the total attack index by adding up all the calculated attack indexes for each evaluation indicator.

In step 244, the computing device 12 may calculate an actual attack index based on the total attack index and a weight according to a correlation between evaluation indicators. In this case, the computing device 12 may set the weight according to the correlation between evaluation indicators based on the degree of similarity for each artifact. For example, the computing device 12 may extract an artifact with the degree of similarity for each artifact of 3, and may assign a weight of 1 times thereto if the artifact is extracted, assign a weight of 2 times thereto if the extracted artifact is included in two evaluation indicators, and assign a weight of 3 times thereto if the extracted artifact is included in three or more evaluation indicators. In addition, the false flag index calculation unit 140 extracts an artifact with the degree of similarity for each artifact of 3, and may assign a weight of 3 times thereto if the extracted artifact is included in a preset evaluation indicator. Here, the preset evaluation indicators may be Malware (Hash value, File type, Behavior pattern, Library), Infrastructure (Network (IP, Domain, Port), or Server (URL, C2 server, and Server hosting records). In this case, the weight according to the correlation between evaluation indicators can be set to the highest value among assigned weights. In addition, the weight according to the correlation between evaluation indicators can be set to one of 1, 2, and 3 times. In addition, the computing device 12 may calculate an actual attack index by multiplying the total attack index and the weight based on the correlation between evaluation indicators. Here, the actual attack index may refer to a value expressing the degree of possibility that infringement traces artifact of the cyber attack is an actual attack.

In step 245, the computing device 12 may calculate a false flag index based on the actual attack index. For example, the computing device 12 may calculate the false flag index by subtracting the actual attack index from 100. Here, the false flag index may refer to a value expressing the degree of possibility that infringement artifact of the cyber attack is the false flag. In the present invention, the cyber attack can be evaluated by calculating the false flag index (false flag index=100−actual attack index) under the assumption that it is an actual attack or a false flag attack.

Therefore, the apparatus for determining false flags of cyber attacks according to an embodiment of the present invention may use cyber infringement information for each hacker and collected cyber infringement information to determine the false flags of hackers who performed cyber attacks based on cyber infringement artifacts.

Figure 4:
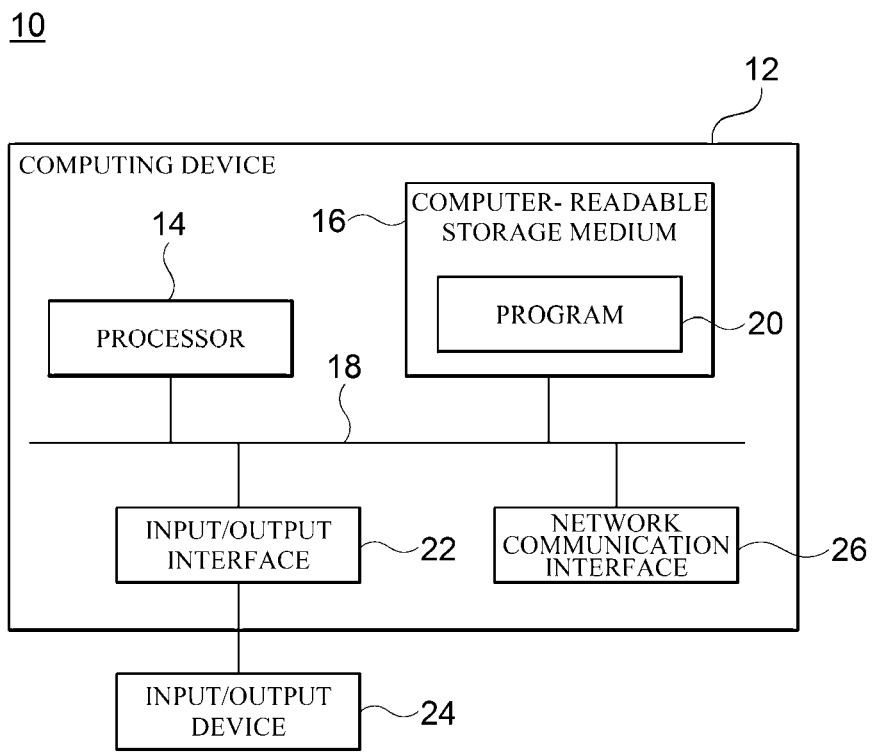
FIG. 4 is a block diagram for illustratively describing a computing environment including a computing device suitable for use in exemplary embodiments.

FIG. 4 is a block diagram for illustratively describing a computing environment 10 including a computing device suitable for use in exemplary embodiments. In the illustrated embodiment, respective components may have different functions and capabilities other than those described below, and may include additional components in addition to those described below.

The illustrated computing environment 10 includes a computing device 12. In one embodiment, the computing device 12 may be the apparatus 100 for determining false flags of cyber attacks.

The computing device 12 includes at least one processor 14, a computer-readable storage medium 16, and a communication bus 18. The processor 14 may cause the computing device 12 to operate according to the exemplary embodiment described above. For example, the processor 14 may execute one or more programs stored on the computer-readable storage medium 16. The one or more programs may include one or more computer-executable instructions, which, when executed by the processor 14, may be configured so that the computing device 12 performs operations according to the exemplary embodiment.

The computer-readable storage medium 16 is configured so that the computer-executable instruction or program code, program data, and/or other suitable forms of information are stored. A program 20 stored in the computer-readable storage medium 16 includes a set of instructions executable by the processor 14. In one embodiment, the computer-readable storage medium 16 may be a memory (volatile memory such as a random access memory, non-volatile memory, or any suitable combination thereof), one or more magnetic disk storage devices, optical disk storage devices, flash memory devices, other types of storage media that are accessible by the computing device 12 and capable of storing desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. The exemplary input/output device 24 may include a pointing device (such as a mouse or trackpad), a keyboard, a touch input device (such as a touch pad or touch screen), a speech or sound input device, input devices such as various types of sensor devices and/or photographing devices, and/or output devices such as a display device, a printer, a speaker, and/or a network card. The exemplary input/output device 24 may be included inside the computing device 12 as a component configuring the computing device 12, or may be connected to the computing device 12 as a separate device distinct from the computing device 12.

Although representative embodiments of the present disclosure have been described in detail, a person skilled in the art to which the present disclosure pertains will understand that various modifications may be made thereto within the limits that do not depart from the scope of the present disclosure. Therefore, the scope of rights of the present disclosure should not be limited to the described embodiments, but should be defined not only by claims set forth below but also by equivalents to the claims.

What is claimed is:

1. A method for determining a false flag of a cyber attack and applying a determination result in detecting cyber attacks, which is performed by a computing device having one or more processors and a memory storing one or more programs executed by the one or more processors, the method comprising:
   collecting, by the computing device, cyber infringement information from an external server;
   selecting, by the computing device, artifacts from the collected cyber infringement information according to a preset criterion;
   classifying, by the computing device, evaluation indicators according to properties of the selected artifacts;
   calculating, by the computing device, a false flag index based on the classified evaluation indicators;
   determining, by the computing device, a false flag for the collected cyber infringement information based on the calculated false flag index; and
   applying the determined result to the computing device that detects cyber attacks to prevent detecting false attacks,
   wherein the calculating of the camouflage tactic index further comprises:
      calculating, by the computing device, an attack index for each selected artifact;
      calculating, by the computing device, an attack index for each evaluation indicator based on the calculated attack index for each artifact;
      calculating, by the computing device, a total attack index by adding up all of the calculated attack indices for each evaluation indicator;
      calculating, by the computing device, an actual attack index based on a weight according to the calculated total attack index and a correlation between the calculated evaluation indicators; and
      calculating, by the computing device, the camouflage tactic index based on the calculated actual attack index,
   the calculating of the attack index further comprises:
      setting, by the computing device, a weight for each artifact by assigning a preset weight to each of the selected artifacts;
      calculating, by the computing device, the similarity for each artifact by comparing the previously stored artifacts and the selected artifacts; and
      calculating, by the computing device, the attack index for each artifact based on the set weight for each artifact and the calculated similarity for each artifact, and
      the weight according to the correlation between the evaluation indicators is a weight according to a correlation between the calculated similarity for each artifact and the classified evaluation indicators.

2. The method of claim 1, further comprising:
   providing the determination result to a user.

3. The method of claim 1, wherein the collecting of the cyber infringement information further includes classifying the collected cyber infringement information by attacker and storing cyber infringement information for each attacker, by the computing device.

4. The method of claim 1, wherein the artifacts are one or more of internet protocol (IP), Domain, Port, uniform resource locator (URL), C2 server (Command & Control server), Server hosting records, HTTP referrer, Log, Email address, Cryptocurrency address, Hardware Information, Encryption/decryption method, Obfuscation, Meta Data, Digital certificate, Packing, Development information, Time stamp, Region, Language, Hash value, File type, Behavior pattern, Library, Zero-day, N-day, Remote Code Execution (RCE), Privilege Escalation, Shellcode, Decoy document, Phishing & Pharming, SNS account, and Attack target.

5. The method of claim 1, wherein the evaluation indicators are one or more of Network, Server, Host based on an infrastructure-related fundamental factor, and Anti-debugging, Development Environment, Malware, Vulnerability, Social Engineering based on an attack technique-related attack factor.

6. The method of claim 1, wherein the calculating of the degree of similarity for each artifact further includes:
   extracting, by the computing device, an artifact for a specific attacker from pre-stored artifacts for each attacker; and
   comparing, by the computing device, the extracted artifacts for the specific attacker and the selected artifacts to calculate the degree of similarity for each artifact for the specific attacker.

7. The method of claim 1, wherein the calculating of the attack index for each evaluation indicator further includes calculating, by the computing device, an attack index for each evaluation indicator by adding up the artifact attack index included in each evaluation indicator according to the classified evaluation indicator.

8. An apparatus for determining a false flag of a cyber attack and applying a determination result in detecting cyber attacks, comprising:
   an information collection unit that collects cyber infringement information from an external server;
   an artifact selection unit that selects artifacts from the collected cyber infringement information according to a preset criterion;
   an evaluation indicator classification unit that classifies evaluation indicators according to properties of the selected artifacts;
   a false flag index calculation unit that calculates a false flag index based on the classified evaluation indicators; and
   a false flag determination unit configured to determine a false flag for the collected cyber infringement information based on the calculated false flag index, and apply the determined result to the computing device that detects cyber attacks to prevent detecting false attacks,
   the camouflage tactic index calculation unit sets a weight for each artifact by assigning a preset weight to each of the selected artifacts, calculates the similarity for each artifact by comparing the previously stored artifacts and the selected artifacts, and calculates the attack index for each artifact based on the set weight for each artifact and the calculated similarity for each artifact, and
   the weight according to the correlation between the evaluation indicators is a weight according to a correlation between the calculated similarity for each artifact and the classified evaluation indicators.

9. The apparatus of claim 8, further comprising:
   a false flag determination unit further configured to provide the determination result to a user.

10. The apparatus of claim 8, wherein the information collection unit classifies the collected cyber infringement information by attacker and stores cyber infringement information for each attacker.

11. The apparatus of claim 8, wherein the artifacts are one or more of internet protocol (IP), Domain, Port, uniform resource locator (URL), C2 server (Command & Control server), Server hosting records, HTTP referrer, Log, Email address, Cryptocurrency address, Hardware Information, Encryption/decryption method, Obfuscation, Meta Data, Digital certificate, Packing, Development information, Time stamp, Region, Language, Hash value, File type, Behavior pattern, Library, Zero-day, N-day, Remote Code Execution (RCE), Privilege Escalation, Shellcode, Decoy document, Phishing & Pharming, SNS account, and Attack target.

12. The apparatus of claim 8, wherein the evaluation indicators are one or more of Network, Server, and Host based on an infrastructure-related fundamental factor, and Anti-debugging, Development Environment, Malware, Vulnerability, and Social Engineering based on an attack technique-related attack factor.

13. The apparatus of claim 8, wherein the false flag index calculation unit extracts an artifact for a specific attacker from pre-stored artifacts for each attacker, and compares the extracted artifact for the specific attacker and the selected artifact to calculate the degree of similarity for each artifact for the specific attacker.

14. The apparatus of claim 8, wherein the false flag index calculation unit calculates an attack index for each evaluation indicator by adding up the artifact attack index included in each evaluation indicator according to the classified evaluation indicators.

\* \* \* \* \*